United States Patent [19]

Werka

[11] Patent Number: 5,082,211

[45] Date of Patent: Jan. 21, 1992

[54] METHOD AND APPARATUS FOR MITIGATING SPACE DEBRIS

[75] Inventor: Robert O. Werka, Huntsville, Ala.

[73] Assignee: Teledyne Industries, Inc., Los Angeles, Calif.

[21] Appl. No.: 606,897

[22] Filed: Oct. 31, 1990

[51] Int. Cl.$^5$ .............................................. B64G 1/22
[52] U.S. Cl. ................................ 244/158 R; 244/164; 244/167
[58] Field of Search ............... 244/1 TD, 158 R, 159, 244/164, 167; 89/36.16

[56] References Cited

U.S. PATENT DOCUMENTS

| | | | |
|---|---|---|---|
| 2,299,327 | 10/1942 | Johnson | 89/36.16 |
| 3,210,026 | 10/1965 | Frisch | 244/159 |
| 3,241,142 | 3/1966 | Raabe | 244/158 R |
| 3,480,232 | 11/1969 | Wyatt | 244/167 |
| 3,532,298 | 10/1970 | Swet | 244/167 |
| 3,582,016 | 6/1971 | Sherman | 244/158 R |
| 4,083,520 | 4/1978 | Rupp et al. | 244/167 |
| 4,097,010 | 6/1978 | Colombo et al. | 244/158 R |
| 4,580,747 | 4/1986 | Pearson | 244/158 R |
| 4,750,692 | 6/1988 | Howard | 244/158 R |
| 4,775,120 | 10/1988 | Marwick | 244/158 R |
| 4,792,108 | 12/1988 | Bull | 244/159 |
| 4,824,051 | 4/1989 | Engelking | 244/158 R |
| 4,923,151 | 5/1990 | Roberts et al. | 244/158 R |
| 4,991,799 | 2/1991 | Petro | 244/158 R |

OTHER PUBLICATIONS

Tethered Satellite Offers Space Power Potential, Aerospace Daily, Jun. 8, 1989, p. 400.
Tackling the Menace of Space Junk, Popular Science, Jul. 1990, pp. 82-85.

Primary Examiner—Joseph F. Peters, Jr.
Assistant Examiner—Carla Mattix
Attorney, Agent, or Firm—Beveridge, DeGrandi & Weilacher

[57] ABSTRACT

A method and apparatus for mitigating space debris having special applicability for use with anti-satellite weapons testing. To mitigate debris in a controlled and predictable fashion a first body is tethered to a lower altitude body. A suitable length of tether is chosen to correlate with the orbital characteristics of the higher altitude body such that the lower altitude body has a relatively low velocity for its orbital altitude. Upon release of the target from the tether or upon debris production by the lower altitude target, the reduced velocity of the body or debris produced for its altitude results in rapid deorbiting of the target or debris. To offset any momentum increase created when the debris is the result of an impact of an object with the lower altitude body, the orbital characteristics are controlled to ensure the proper deorbiting velocity is achieved. A counter rotation of the tether system can also be used to negate an increase in velocity due to impact.

49 Claims, 6 Drawing Sheets

METHOD AND APPARATUS FOR MITIGATING SPACE DEBRIS

BACKGROUND OF THE INVENTION

Field of the Invention

The present invention features a method and apparatus involving the tethering of one orbital body to another orbital body to provide for controllable, predictable deorbit of debris produced by the lower altitude orbital body. More specifically, the present invention provides a means for mitigating debris resulting from a kinetic energy weapon intercept of a lower altitude tethered target.

Background Discussion

It is estimated that mankind has deposited over 6.5 million pounds of man-made material into orbit about the earth and much of that material is in the form of space debris currently encircling the earth. These man-made orbiting debris, as well as debris of natural celestial origin (e.g., meteorites), poses a serious threat to manned and unmanned spacecraft.

Although the amount of debris of natural celestial origin has remained essentially constant, the amount of space debris has increased over time. Based on an extrapolation of past trends, it is estimated that the amount of trackable space debris will increase by a factor of between 2 and 8 over the next 20 years. With this increase in orbiting debris, the probability of a collision with an object increases proportionally. Recent estimates of expected collision probabilities suggest that in a one thousand-day (roughly three year) period from 1980, foreign objects with a radius of 10 meters had about a 0.2 percent chance of colliding with floating debris. In 1984, this figure was estimated to have risen to about 0.5 percent, and in 1995 is expected to increase to 1.5 percent. For an object with a radius of 50 meters, the above probability figures would be twenty-five times as high, leading to the possibility of a 40 percent probability by 1995 of debris impacting an object with a radius of 50 meters. For even larger orbiting bodies such as a space station, the probability would be still further increased.

The most common of space debris is that which is less than 10 centimeters in diameter, representing an estimated 99 percent of man-made debris in space. Debris of less than 10 centimeters in size cannot currently be tracked. Nonetheless, even tiny particles of space debris can be very destructive. An example of the destructive potential of small particles of debris can be seen in the damage of a $50,000 glass windshield on Space Shuttle Mission STS-B following impact with what was believed to be a fleck of paint colliding at an estimated 80,000 miles per hour. The impact of the fleck of paint left a crater in the windshield which necessitated its replacement.

Proposed activity in space such as the development of a space station or the testing of anti-satellite interceptors poses the threat of further creation of man-made space debris. The natural mechanism of orbital decay gradually removes space debris, this mechanism suffers from the drawback of being noncontrollable and slow in operation with the time to deorbit depending on a large extent on the initial altitude of the debris, the debris' own velocity, and the shape of the mass. This natural deorbiting mechanism relies upon atmospheric drag which causes a decrease in orbital velocity for an object following repeated collisions with atmospheric particles. This drag effect depends both on the object (drag is proportional to its average cross-sectional area, and inversely proportional to its density) and on the atmosphere (drag is proportional to the atmospheric density and to the average velocity of the atmospheric particles relative to the object). However, the deorbiting of an orbital body can be a slow process. For example, at an altitude of 300 kilometers, particles can take weeks or months to decay into the earth's atmosphere. At a 500 kilometer altitude, a marble sized object will last at least a year, at 800 kilometers at least 30 years and at 1200 kilometers at least a few centuries. Accordingly, the minimization of space debris generation is of paramount importance if natural processes are the only mechanism for removal.

While tethered space systems have been discussed as far back as the early 1900's in a science fiction context and some tethered applications have been evaluated since the 1970's, insofar as known to Applicant, there has not been considered the possibility of using a tethered system for the purpose of mitigating the generation of debris, especially that produced during kinetic energy weapon intercept testing.

U.S. Pat. No. 4,097,010 to Columbo et al. discloses a system for conducting space experiments which includes a powered spacecraft (e.g., Space Shuttle) and a suborbital satellite connected to the powered space craft by way of a flexible tether. The experiment system is described as being useful for conducting research in the areas of upper atmosphere measurements, gravity gradient measurements, geomagnetic experiments, and radio physics research. In U.S. Pat. No. 4,097,010 there is lacking discussion of connecting a first orbiting body to second orbiting body by a tether and positioning the tethered body at a lower altitude orbit such that any resulting debris will rapidly and controllably deorbit into the earth's atmosphere.

U.S. Pat. No. 4,824,051 to Engelking illustrates a tethered object being dragged through a magnetic field to produce energy and prevent degradation of the orbit of the Space Shuttle.

U.S. Pat. No.4,580,747 to Pearson illustrates the tethered suspension of an aerodynamic lifting body to assist in maintaining the desired orbiting plane of the Space Shuttle.

Various other patents such as U.S. Pat. Nos. 3,241,142; 3,582,016; and 3,532,298 disclose the use of tether lines connected between two bodies to assist in gravity stabilization.

SUMMARY OF THE INVENTION

The present invention provides a means for mitigating the creation of space debris in a controllable and relatively fast manner. The method of the present invention for mitigating space debris in a controlled fashion includes placing a first body in an orbit about a planet and positioning a second body, which is subject to producing debris, lower in altitude to said planet. The positioning of the second body lower in altitude to the planet is achieved by extending a tether line joining the first body and the second body out a predetermined distance away from the first body. By correlating the amount of tether extension with the characteristics of the orbit of the first and second bodies, it is possible to achieve a rapid and controlled deorbiting of any space debris produced by the second body. In fact, through the choice of a particular orbit and tether extension, it is possible to have debris produced by the second body deorbit in less than about one half orbital periods.

One embodiment of the method of the present invention includes placing the first body in an orbit, either circular or eliptical about a planet, with the tethered second body in a tracking relationship with the center of orbit of the first body. The second body is thus maintained essentially in alignment with a line extending from the center of gravity of the orbiting bodies to the center of gravity of the planet. Preferably, the first body is more massive (e.g., 5 times greater) than the second body such that the center of gravity of the tethered assembly is closer to the first body and thus further out in altitude from the planet. The second body is thus made to travel slower than it usually would for its orbital altitude due to the braking effect brought about by the slower moving first body to which the second body is connected. Accordingly, should any debris be produced by the second body or should the second body itself becomes disconnected from the tether, a new eliptical orbit for the debris or disconnected second body would result with the released material following a course dictated by the slower velocity of the second body which precipitates the controlled deorbit into the planet's atmosphere.

In one embodiment of the invention, which has particular usefulness in anti-satellite weapons testing, the second body is an anti-satellite target while the first body is a controlling satellite tethered to the target. In view of the fact that the impact of the anti-satellite interceptor (e.g., kinetic energy weapon intercept) could cause the debris to increase in velocity, care must be taken that the increased velocity is taken into account when establishing the orbital parameters and tether length to assure deorbit of the debris produced. Some data exist to indicate that a collision of a target with an anti-satellite interceptor could introduce an added velocity factor of 1.3 times the original velocity of the target to that fraction of the debris which is ejected in the direction of the target motion. The present invention introduces a plurality of methods which compensate for the potential additional velocity of the impacted debris. One method involves the use of longer tethers which place the first body at a high enough altitude orbit to compensate for the velocity addition to the debris generated from the tethered second body.

The second method, involves a change in the orbit of the tethered system from, for example, a circular orbit to an eliptical orbit. Intercept would take place at the point in the orbit where the tethered system would be moving the slowest in accordance with Kepler's second law. In this way, the reduced velocity created by the tethered relationship and the choice of intercept as the point where the tethered system is at its slowest point in its orbit compensates for the velocity addition to the debris generated from the tethered second body.

The third method involves the use of any of the above-described methods together with the step of placing the tethered system in a rotating state about the center of gravity of the tethered system. By timing the impact of the interceptor with the position of the rotating second body, it is possible to use the rotational velocity to offset the velocity addition to the debris generated by the collision with the anti-satellite interceptor.

Although the methods of the present invention are especially suited for kinetic weapons intercept target testing, the present invention has further uses. For example, a collection of space shuttle external fuel storage tanks can be tethered to a space station with the fuel storage tanks at a much higher altitude than the space station. With this arrangement, the space station can be braked during its orbit by the slower moving fuel tanks and any debris produced during construction or maintenance of the space station (e.g., a released wrench) could be placed in an assured, controlled deorbit into the earth's atmosphere.

To achieve the goal of mitigating space debris caused during anti-satellite intercept testing, the present invention utilizes an apparatus which includes a controlling satellite tethered to an anti-satellite interceptor target. The controlling satellite includes a tether dispensing means for extending and retracting the tether out away from the satellite to a sufficient length to achieve the desired decontrolled orbit. The satellite would be placed at a higher altitude orbit than the tethered target.

The satellite can include guidance controls such as reaction jets as well as power generation and propulsion means for maintaining the predetermined orbit. The anti-satellite target could use an inflatable or rigid body. Also, the controlling satellite is preferably about 5 times greater in mass than the target so as to place the center of gravity of the tethered system at a relatively higher altitude closer to the center of the controlling satellite.

Although the tether could be constructed of any lightweight, high strength fiber, current technology recommends the use of a synthetic organic fiber such as KEVLAR (TM). The incorporation of an electrical conductive coating to the fiber would enable the tether to be used for energy transmission (e.g. data or command signals, electrical power) as well as for load carrying between the controlling satellite and the target body.

Based upon current materials technology, this invention is limited in practical application to tether lengths ranging up to about 675 nmi for constant cross-section tethers and from up to about 1,000 nmi for tapered cross-section tethers. Likewise, current space launch systems place practical weight limits on the satellite/tether system to on the order of 40,000 pounds lifted to low earth orbit.

A preferred embodiment of the present invention places both the lower altitude body and the higher altitude body in orbit above the earth with the lower orbital body having a minimum altitude of about 110 nmi or, even more preferably, a minimum altitude of about 140 nmi (minimum stable orbit altitude). These altitude ranges place the lower altitude body in a position where air resistance is essentially not a factor such that a large amount of fuel is not wasted in preventing the lower altitude body from dropping in altitude prior to release or impact.

BRIEF DESCRIPTION OF THE DRAWINGS

These and other objects and advantages of the invention, as well as the details of illustrative embodiments, will be more fully understood from the following specification and drawings, in which.

DETAILED DESCRIPTION OF THE PREFERRED EMBODIMENTS

Figure 1A:
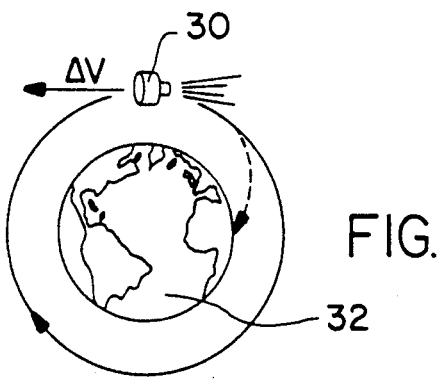
FIGS. 1A to 1C illustrate three different methods of removing a satellite from its orbit.
Figure 1B:
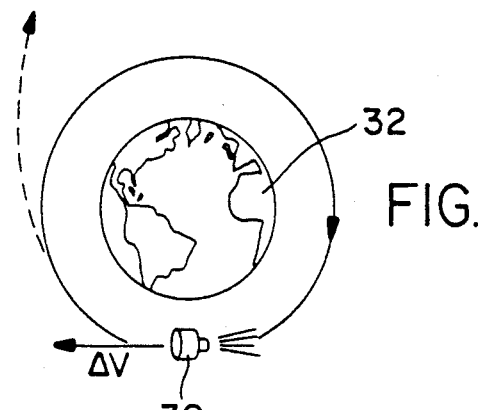
Figure 1C:
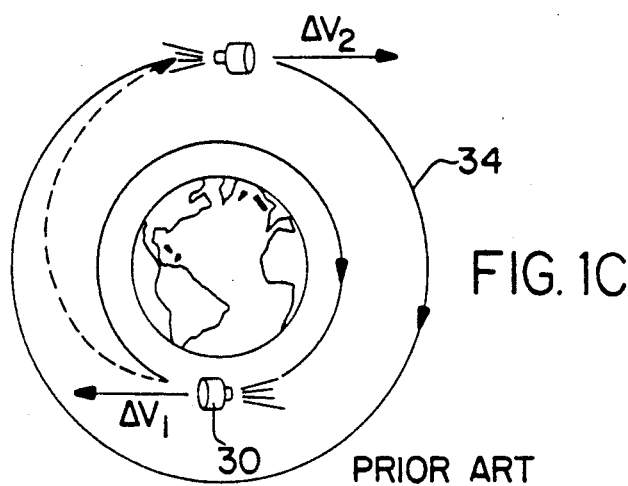

FIGS. 1A-1C illustrate three prior art methods of removing satellites from orbit. FIG. 1A features satellite 30 orbiting about planet 32. FIG. 1A further illustrates that the decrease ($\Delta V$) in the orbital velocity of satellite 30, which is brought about by reverse thrusting, results in orbital decay of satellite 30. Thus, the prior art method of achieving a decaying orbit for a satellite is shown to involve the manipulation of the satellite and the activation of thrusters so as to brake the satellite 30 to a lower velocity which results in the satellite deorbiting into the atmosphere of the earth.

FIG. 1B illustrates satellite 30 orbiting about planet 32. As shown in FIG. 1B, an increase in velocity as represented by velocity vector $\Delta V$ will bring the satellite into a trajectory which enables the satellite to escape the earth's gravitational pull. Thus, satellite 30 is removed from an orbit about the earth by manipulation of the satellite into a specific position such that the satellite will escape the earth's pull.

FIG. 1C illustrates another prior art method of removing a satellite from its orbit. As shown in FIG. 1C at time $T_1$ satellite 30 is subjected to an increase in velocity such that satellite 30 assumes higher disposal orbit 34 following a suitably chosen secondary velocity increase at time $T_2$.

Considering FIG. 1A at a point of time prior to implementation of the reverse thrusting, if a particle were to fall away from satellite 30 it would essentially assume the same velocity as the velocity of satellite 30. Hence, the element would assume, at least for awhile, essentially the same orbit as satellite 30. If the element is relatively close to the earth, the friction of atmospheric particles colliding with the moving object would tend to brake the element. This braking force is, among other things, proportional to the number of particles which the object encounters as it moves through the atmosphere or at some distance above the defined upper reaches of the earth's atmosphere. Consequently, since the number of such particles increases with decreasing altitude so does the braking force. At a certain altitude the braking force will become so strong that the object is no longer capable of maintaining its orbital motion and will descend to still lower altitudes due to loss of speed. Thus, as the element penetrates still deeper into the earth's atmosphere, the acceleration of the motion intensifies, and, eventually, the object will reach the surface of the earth or, alternatively, burn up in the atmosphere. However, this eventuality is unpredictable, being due to random events such as frequency of atmospheric particle collisions and element orientation during the process. If the element's orbital trajectory reaches altitudes close to 100 kilometers (54 nmi) from the earth's surface, the braking force will be strong enough to bring the element down in a rapid fashion. As all satellites are positioned well above the 100 kilometer altitude from the earth, debris falling off such satellites can remain in orbit about the earth for very long periods of time and thus present a prolonged safety problem with respect to manned and unmanned spacecraft.

The present invention provides a method and apparatus which hastens, in a controlled fashion, the deceleration of any particle of debris into a lower altitude orbit which results in a rapid decay into the earth's atmosphere or, alternatively, a predetermined impact point on the earth.

Figure 2:
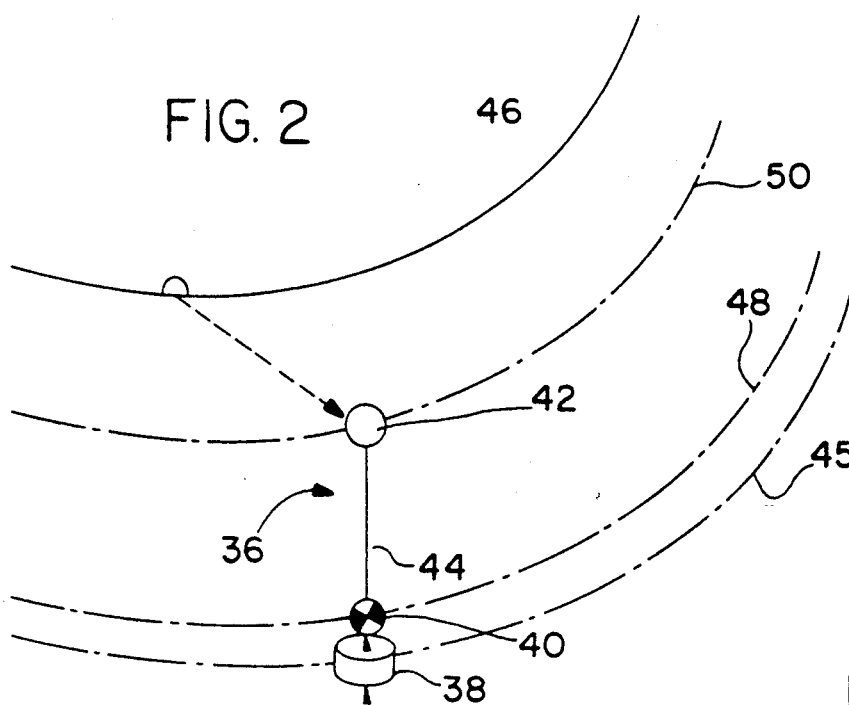
FIG. 2 illustrates the tethered assembly of the present invention in a circular orbit about earth.

FIG. 2 illustrates tether system 36 of the present invention which comprises first orbiting body 38 of mass $M_1$ tethered to lower altitude orbiting body 42 having mass $M_2$. The tethering of first body 38 to body 42 is achieved through use of tether 44 which is connected at its ends to the two orbiting bodies. Taking into consideration mass $M_1$, $M_2$ and the mass of tether 44, the center of gravity for tether system 36 is designated as 40. For ease of explanation, the first orbiting body 38 is assumed in a circular orbit 45 about the planet (e.g., earth) 46 below. Center of gravity 40 of tether system 36 then also exhibits a circular orbit which is designated 48 in FIG. 2. Body 42 is also shown in FIG. 2 to be in a circular orbit 50 which is of a lesser altitude than the orbit for the center of mass 40 and first body 38.

With the assumption of a two body model, Newton's law of gravitation provides that the velocity of a body orbiting in a circle is as follows:

$VC = (\mu/a_1)^{\frac{1}{2}}$ with $\mu$ equalling earth's gravitational constant $3.981 \times 10^5$ km$^3$/S$^2$ and "$a_1$" representing the altitude of the circular orbit plus the radius of the earth (6371.3 km). Newton's law of gravitation dictates that an orbiting body higher in altitude from the surface of the earth will have a lesser velocity than an orbiting body of a lesser altitude. For example, if the altitude of first orbiting body 38 is 1,000 kilometers from the surface of the earth and the altitude of the second body 42 is 800 kilometers from the surface of the earth, than the velocity of each of the bodies in a nontethered state would be as follows:

$$VC_1 = (\mu/a_1)^{\frac{1}{2}}$$
$$= \left[ \frac{3.981 \times 10^5 \text{ km}^3/S^2}{(6371.3 \text{ km} + 1000 \text{ km})} \right]^{\frac{1}{2}}$$
$$VC_1 = 7.35 \text{ km/S}$$

$$VC_2 = (\mu/a_2)^{\frac{1}{2}}$$
$$= \left[ \frac{3.981 \times 10^5 \text{ km}^3/S^2}{(6371.3 \text{ km} + 800 \text{ km})} \right]^{\frac{1}{2}}$$
$$VC_2 = 7.45 \text{ km/S}$$

Thus, in an untethered state the velocity of the higher altitude body would be less than the velocity of the lower altitude body. Once a tether is attached, the lower altitude body would be prevented from achieving the velocity that it assumes in a nontethered state due to the braking effect created by the first, slower moving body which is positioned at a higher altitude.

The amount to which the lower altitude body is restricted from its normal nontethered velocity depends upon the length of the tether and the relationship between the masses. Hence, with an extremely long tether the first body could be placed at even a higher altitude and, consequently, even a lesser velocity. The lowering in velocity of the first body would result in the lower altitude body being even further prevented from obtaining the velocity it would assume in a nontethered state. Also, if the higher altitude body is made of a larger mass, then the center of gravity of the tethered system would fall closer to the higher altitude body than to the lower altitude body. This relationship would mean that the velocity of the higher altitude body would have more influence on the velocity of the entire system. This relationship thus provides the ability to reduce the velocity of the lower altitude body by increasing the ratio value of mass $M_1$ over mass $M_2$.

Since the lower altitude body is travelling at a lesser velocity than it would in a nontethered state, as soon as the lower altitude orbiting body is released, it would descend in altitude. Therefore, the lower altitude orbiting body would be subject to a more rapid deorbit than a similarly positioned non-tethered orbiting body. Also, since the higher altitude orbiting body is travelling at a velocity which is faster than it would assume had it been untethered, upon release of the tether, the higher altitude orbiting body would assume even a higher altitude after release.

Figure 3B:
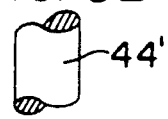
FIG. 3B shows a cut away view of a tapered tether.
Figure 3:
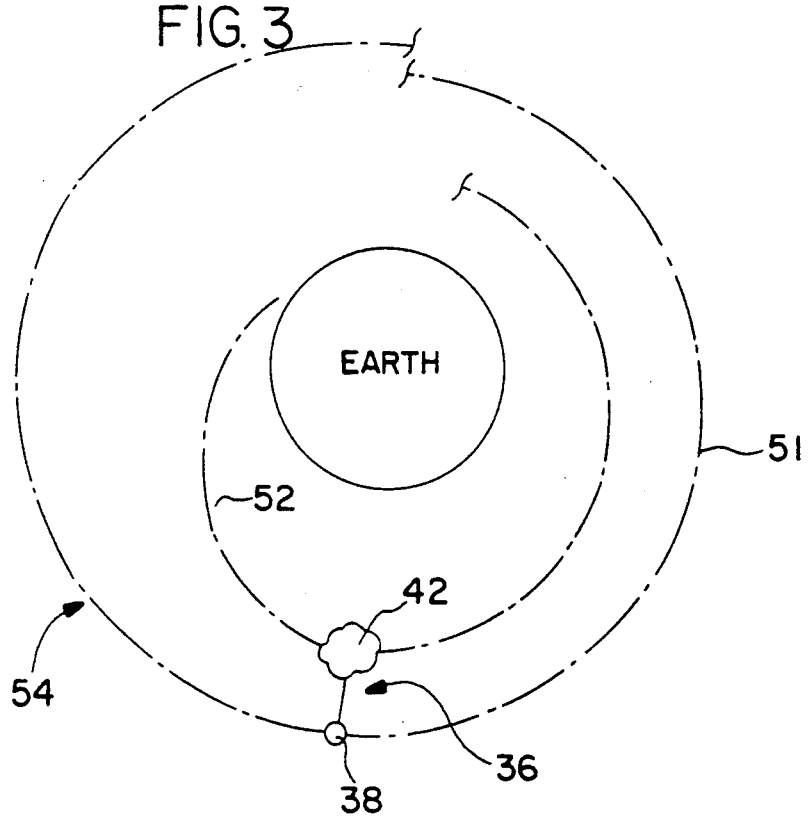
FIG. 3 illustrates the orbits which the components of the tethered assembly would assume following release or intercept of the lower altitude body.

This relationship is shown in FIG. 3 which illustrates a tethered system 36 originally rotating in a clockwise circular orbit about the earth until the point of impact wherein the impacted lower orbiting body 42, upon being released from the tether, begins its rapid deorbit designated 52. Once the higher altitude orbiting body 38 is released from its attachment with the lower altitude orbiting body 42, it will increase its altitude as represented by 54 in FIG. 3.

Assuming that any debris produced by the target would not have a decrease or increase in momentum, all debris produced would essentially follow the same orbital path designated 52. To illustrate the controllability of the deorbiting of particles of debris, with respect to the form of orbit, altitude of orbit, length of tether and mass of the first and second bodies, an example is provided below.

Figure 3A:
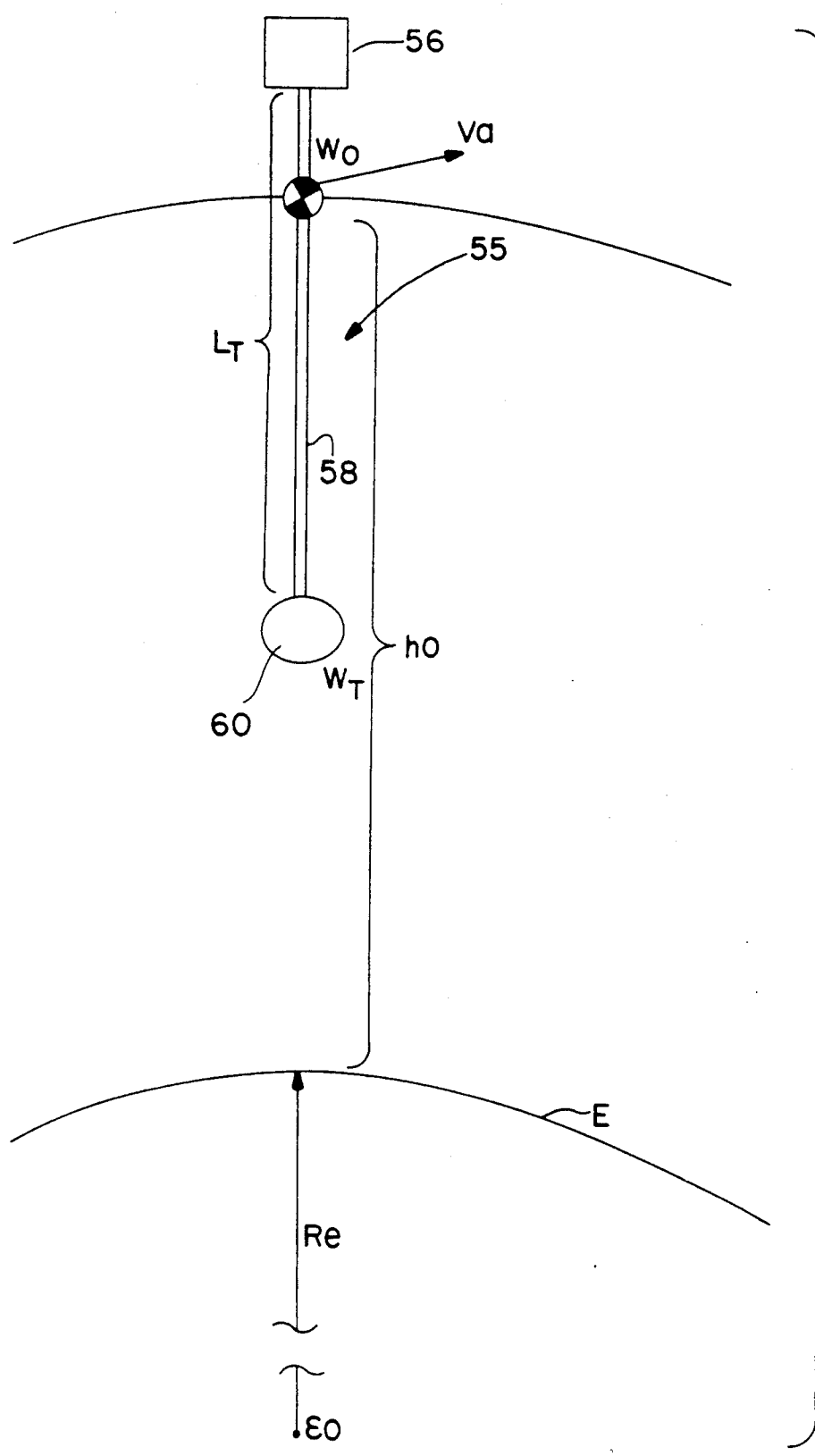
FIG. 3A provides a schematic illustration of tethered system 55 in a circular orbit.

FIG. 3A provides a schematic illustration of tethered system 55 in orbit about earth E. Tether system 55 includes satellite 56 and tether 58 as well as target 60. Tether 58 is of length $L_T$ and is attached at one end to satellite 56 and at its other end to target 60. Target 60 is of weight $W_T$, while $W_o$ represents the combined weight of satellite 56 and tether 58. Also, in view of the low weight of target 60, $W_o$ and $W_T$ are treated as being essentially equal to $W_o$ (i.e., $W_o + W_T \approx W_o$).

The velocity of the tethered system in circular orbit ($V_c$) is as follows:

$V_c = (\mu/(Re+ho))^{\frac{1}{2}}$ with $\mu$ being the earth's gravitational constant (14.08 E 15 ft$^3$/S$^2$) Re being the earth's radius (3440 nmi) and ho being the altitude above Earth E of the tethered system's center of gravity 62.

For the lower altitude target 60, the velocity ($V_t$) of the target is as follows:

$$V_T = V_c \left[ \frac{Re + ho - L_T}{Re + ho} \right]$$

The equation for an eliptical orbit is:

$$V_e = \left[ \frac{2\mu}{R} - \frac{\mu}{a} \right]^{\frac{1}{2}}$$

which equation can be rearranged to read:

$$a = \left[ \frac{2}{R} - \frac{V_e^2}{\mu} \right]^{-1}$$

wherein "a" represents the semimajor axis of the eliptical orbit. Thus, the length of the perigee (Rperigee) is determined by:

Rperigee = 2a − Rapogee

For lower altitude tethered targets at release:

Rapogee = Re + ho − $L_T$.

Based on the foregoing equations, for a lower altitude tethered target hanging on a 50 nmi tether ($L_T$=50) with the center of gravity of the system in a 250 nmi circular orbit. The velocity of the tethered target as well as any debris produced thereby (assuming no momentum change at impact) is determined as follows:

$$V_c = \left[ \frac{14.08 \ E \ 15}{(3440 + 250) \ 6080} \right]^{\frac{1}{2}} = 25052 \text{ ft/s}$$

In other words, $V_c$ in FIG. 3A is equal to 25052 ft/s. Thus, prior to impact, the tethered target would have a velocity $V_T$ determined as follows:

$$V_T = V_c \left[ \frac{Re + ho - L_T}{Re + ho} \right]$$

$$V_T = 25052 \left[ \frac{3440 + 250 - 50}{3440 + 250} \right] = 24712 \text{ ft/s}$$

Considering again FIG. 3, following impact the target or any debris produced by the target (again, assuming no appreciable change in momentum following impact) will assume the orbit designated by reference number 52. The eliptical orbit designated, in part, by reference number 52 will have a semimajor axis "a" of:

$$a = \left[ \frac{2}{R} - \frac{V_T^2}{\mu} \right]^{-1}$$

$$a = \left[ \frac{2}{(3440 + 250 - 50) \ 6080} - \frac{24712^2}{14.08 \ E \ 15} \right]^{-1}$$

$a = 21277600$ ft. $= 3500$ nmi.

With knowledge of the value of "a", the length of the perigee for the eliptical orbit designated 52 can be determined by:

Rperigee = 2 (3500) − (3440 + 250 − 50)

Rperigee = 3360 nmi.

However, the radius of the earth is 3440 nmi and thus the debris released by the target would be unable to complete the eliptical orbit. Instead, the debris released by the target would enter the atmosphere in less than ½ a revolution of the eliptical orbit.

Figure 4:
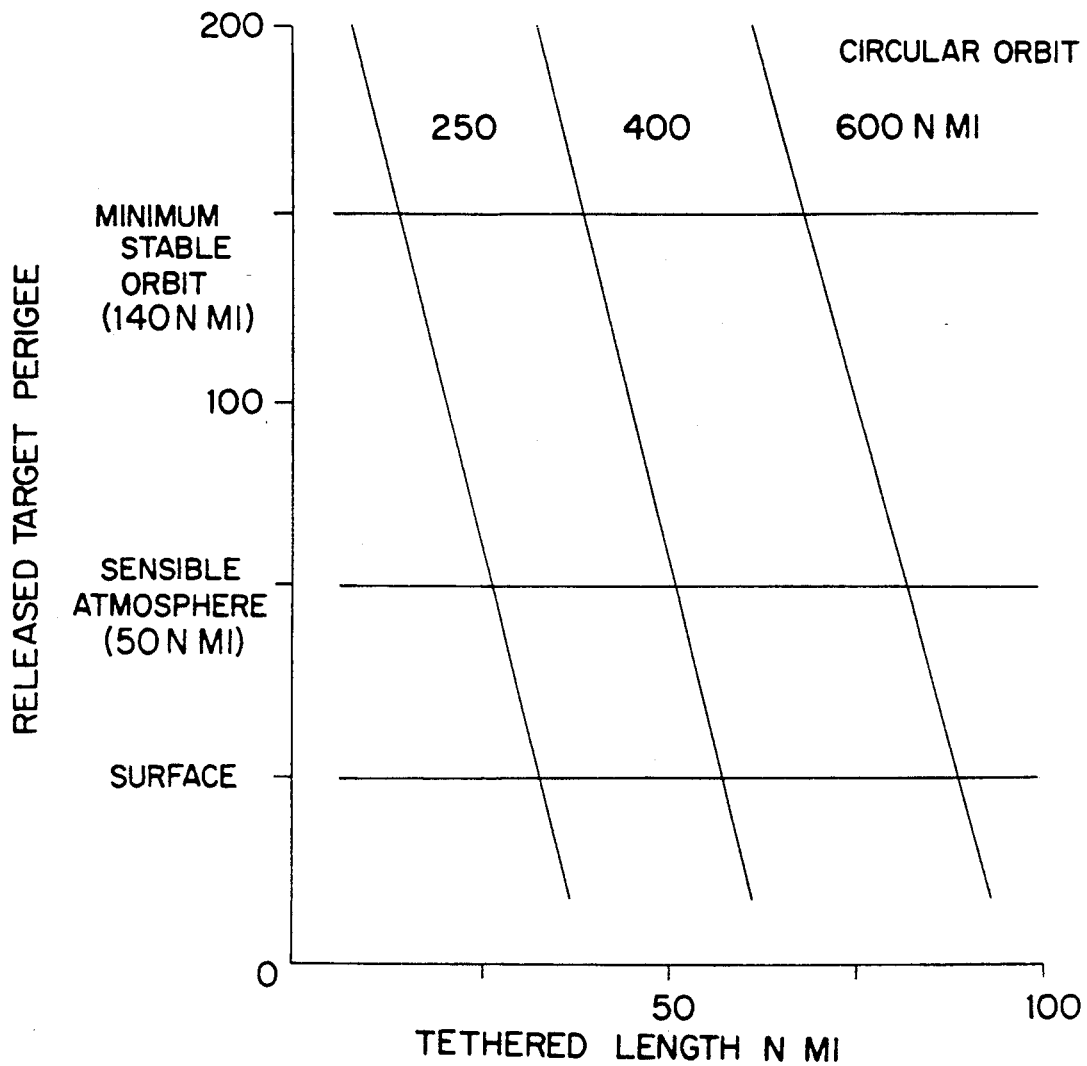
FIG. 4 shows an exemplary graphic representation of the relationship between tether length, circular orbit of the tether system, and the released target perigee.

FIG. 4 illustrates, graphically, the relationship between tether length, circular orbit, released target perigee, and the earth's atmosphere. FIG. 4 designates earth surface 70, sensible atmosphere 72 (50 nmi), and minimum stable orbit 74 (140 nmi).

Figure 5:
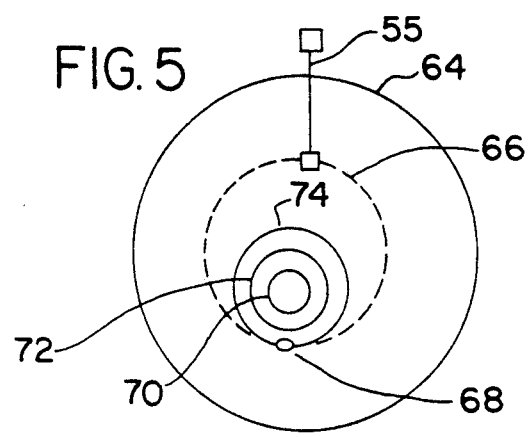
FIG. 5 shows in schematic form various orbits for the tether assembly and the orbit's relationship with respect to the earth and its atmospheric cover.

FIG. 5 provides a schematic illustration of the initial circular orbit 64 of tethered system 55 and the released target (or debris) orbit 66 and perigee 68. In addition, FIG. 5 also illustrates the earth's surface 70 in relation to the sensible atmosphere 72 and minimum stable orbit 74.

As noted previously, particles in orbit about the earth will tend to deorbit with the duration of the deorbit period directly related to the height above the earth's surface. To achieve a controlled deorbit, the released target perigee preferably places the debris at no greater than the outer boundary of the earth's atmosphere which is about 162 nmi above the earth's surface. The released target's perigee could be less than or equal to the minimum stable orbit height of about 140 nmi which would allow reentry within a few days due to random atmospheric drag forces.

Table I shown below provides some insight as to the ability of the present invention to control the deorbiting of the debris through variations in height of the circular orbit (hc) and the length of the tether. A review of the values in Table I shows the results that variations in the tether length and the altitude of circular orbit have upon the released target's (or produced debris) subsequent orbit above the earth's surface. For example, any debris produced by a tetherless target at a pre-impact orbit of 325 nmi would retain essentially the same circular orbit assuming no change in momentum. However, by adding a tether which extends for 30 nmi the released target, or debris produced by the target, has a perigee height of 121 nmi above the surface of the earth which is within a portion of the earth's atmosphere capable of rapidly and controllably deorbiting the released target (or debris) due to contact with atmospheric particles.

TABLE I

| hc | lt | rp | Vc | Vt |
| --- | --- | --- | --- | --- |
| 150 | 0 | 150 | 25398 | 25398 |
| | 10 | 80.8 | 25398 | 25327.42 |
| | 20 | 13.27 | 25398 | 25256.67 |
| | 30 | −52.7 | 25398 | 25185.92 |
| | 40 | −117 | 25398 | 25115.18 |
| | 50 | −180 | 25398 | 25044.45 |
| | 60 | −241 | 25398 | 24973.68 |
| | 70 | −302 | 25398 | 24902.93 |
| | 80 | −360 | 25398 | 24832.19 |
| | 90 | −418 | 25398 | 24761.44 |
| | 100 | −474 | 25398 | 24690.69 |
| 175 | 0 | 175 | 25310 | 25310 |
| | 10 | 106 | 25310 | 25240 |
| | 20 | 38 | 25310 | 25170 |
| | 30 | −28 | 25310 | 25100 |
| | 40 | −92 | 25310 | 25030 |
| | 50 | −155 | 25310 | 24960 |
| | 60 | −216 | 25310 | 24890 |
| | 70 | −277 | 25310 | 24820 |
| | 80 | −336 | 25310 | 24750 |
| | 90 | −393 | 25310 | 24680 |
| | 100 | −450 | 25310 | 24610 |
| 200 | 0 | 200 | 25223 | 25223 |

TABLE I-continued

| hc | lt | rp | Vc | Vt |
| --- | --- | --- | --- | --- |
| | 10 | 131 | 25223 | 25153 |
| | 20 | 63 | 25223 | 25084.5 |
| | 30 | −2.8 | 25223 | 25015 |
| | 40 | −67.4 | 25223 | 24945 |
| | 50 | −130.4 | 25223 | 24876 |
| | 60 | −192 | 25223 | 24807 |
| | 70 | −252 | 25223 | 24738 |
| | 80 | −311 | 25223 | 24668 |
| | 90 | −369 | 25223 | 24599 |
| | 100 | −425 | 25223 | 24530 |
| 225 | 0 | 225 | 25137 | 25137 |
| | 10 | 155 | 25137 | 25068 |
| | 20 | 88 | 25137 | 25000 |
| | 30 | 22.14 | 25137 | 24931 |
| | 40 | −42 | 25137 | 24862 |
| | 50 | −105 | 25137 | 24794 |
| | 60 | −167 | 25137 | 24725 |
| | 70 | −227 | 25137 | 24656 |
| | 80 | −286 | 25137 | 24588 |
| | 90 | −344 | 25137 | 24519 |
| | 100 | −400 | 25137 | 24451 |
| 250 | 0 | 250 | 25051 | 25051 |
| | 10 | 180.8 | 25051 | 24983 |
| | 20 | 113 | 25051 | 24915 |
| | 30 | 47.09 | 25051 | 24847 |
| | 40 | −17 | 25051 | 24780 |
| | 50 | −80 | 25051 | 24712 |
| | 60 | −142 | 25051 | 24644 |
| | 70 | −202 | 25051 | 24576 |
| | 80 | −261 | 25051 | 24508 |
| | 90 | −319 | 25051 | 24440 |
| | 100 | −376 | 25051 | 24372 |
| 275 | 0 | 275 | 24967 | 24967 |
| | 10 | 206 | 24967 | 24900 |
| | 20 | 138 | 24967 | 24832 |
| | 30 | 72 | 24967 | 24765 |
| | 40 | 7.4 | 24967 | 24698 |
| | 50 | −55 | 24967 | 24631 |
| | 60 | −117 | 24967 | 24563 |
| | 70 | −178 | 24967 | 24496 |
| | 80 | −237 | 24967 | 24429 |
| | 90 | −295 | 24967 | 24362 |
| | 100 | −351 | 24967 | 24295 |
| 300 | 0 | 300 | 24883 | 24883 |
| | 10 | 231 | 24883 | 24817 |
| | 20 | 163 | 24883 | 24750 |
| | 30 | 97 | 24883 | 24684 |
| | 40 | 32.3 | 24883 | 24617 |
| | 50 | −31 | 24883 | 24550 |
| | 60 | −93 | 24883 | 24484 |
| | 70 | −153 | 24883 | 24417 |
| | 80 | −212 | 24883 | 24351 |
| | 90 | −270 | 24883 | 24284 |
| | 100 | −327 | 24883 | 24218 |
| 325 | 0 | 325 | 24800 | 24800 |
| | 10 | 255 | 24800 | 24735 |
| | 20 | 188 | 24800 | 24669 |
| | 30 | 121 | 24800 | 24603 |
| | 40 | 57 | 24800 | 24537 |
| | 50 | −6 | 24800 | 24471 |
| | 60 | −67 | 24800 | 24405 |
| | 70 | −128 | 24800 | 24339 |
| | 80 | −187 | 24800 | 24273 |
| | 90 | −245 | 24800 | 24208 |
| | 100 | −302 | 24800 | 24142 |
| 350 | 0 | 350 | 24718 | 24718 |
| | 10 | 280 | 24718 | 24633 |
| | 20 | 213 | 24718 | 24588 |
| | 30 | 146 | 24718 | 24523 |
| | 40 | 82 | 24718 | 24458 |
| | 50 | 19 | 24718 | 24392 |
| | 60 | −43 | 24718 | 24327 |
| | 70 | −103 | 24718 | 24262 |
| | 80 | −163 | 24718 | 24197 |
| | 90 | −221 | 24718 | 24131 |
| | 100 | −278 | 24718 | 24066 |
| 375 | 0 | 375 | 24637 | 24637 |
| | 10 | 305.8 | 24637 | 24573 |
| | 20 | 238 | 24637 | 24508 |
| | 30 | 171 | 24637 | 24444 |
| | 40 | 107 | 24637 | 24379 |

TABLE I-continued

| hc | lt | rp | Vc | Vt |
|---|---|---|---|---|
| | 50 | 43 | 24637 | 24314 |
| | 60 | −18 | 24637 | 24250 |
| | 70 | −79 | 24637 | 24185 |
| | 80 | −138 | 24637 | 24121 |
| | 90 | −196 | 24637 | 24056 |
| | 100 | −253 | 24637 | 23992 |
| 400 | 0 | 400 | 24557 | 24557 |
| | 10 | 330 | 24557 | 24493 |
| | 20 | 263 | 24557 | 24429 |
| | 30 | 196 | 24557 | 24365 |
| | 40 | 132 | 24557 | 24301 |
| | 50 | 69 | 24557 | 24237 |
| | 60 | 6.5 | 24557 | 24173 |
| | 70 | −54 | 24557 | 24109 |
| | 80 | −113 | 24557 | 24045 |
| | 90 | −171 | 24557 | 23981 |
| | 100 | −229 | 24557 | 23917 |
| 425 | 0 | 425 | 24477 | 24477 |
| | 10 | 355 | 24477 | 24414 |
| | 20 | 288 | 24477 | 24351 |
| | 30 | 221 | 24477 | 24287 |
| | 40 | 156 | 24477 | 24224 |
| | 50 | 93 | 24477 | 24161 |
| | 60 | 31 | 24477 | 24097 |
| | 70 | −29 | 24477 | 24034 |
| | 80 | −89 | 24477 | 23971 |
| | 90 | −147 | 24477 | 23907 |
| | 100 | −204 | 24477 | 23844 |
| 450 | 0 | 450 | 24399 | 24399 |
| | 10 | 381 | 24399 | 24336 |
| | 20 | 313 | 24399 | 24273 |
| | 30 | 246 | 24399 | 24210 |
| | 40 | 181 | 24399 | 24148 |
| | 50 | 118 | 24399 | 24085 |
| | 60 | 56 | 24399 | 24022 |
| | 70 | −4.6 | 24399 | 23960 |
| | 80 | −64 | 24399 | 23897 |
| | 90 | −122 | 24399 | 23834 |
| | 100 | −179 | 24399 | 23771 |
| 475 | 0 | 475 | 24321 | 24321 |
| | 10 | 405 | 24321 | 24259 |
| | 20 | 338 | 24321 | 24196 |
| | 30 | 271 | 24321 | 24134 |
| | 40 | 206 | 24321 | 24072 |
| | 50 | 143 | 24321 | 24010 |
| | 60 | 81 | 24321 | 23948 |
| | 70 | 20 | 24321 | 23886 |
| | 80 | −39 | 24321 | 23824 |
| | 90 | −98 | 24321 | 23762 |
| | 100 | −155 | 24321 | 23699 |
| 500 | 0 | 500 | 24243 | 24243 |
| | 10 | 430 | 24243 | 24182 |
| | 20 | 362 | 24243 | 24120 |
| | 30 | 296 | 24243 | 24059 |
| | 40 | 231 | 24243 | 24997 |
| | 50 | 168 | 24243 | 24997 |
| | 60 | 105 | 24243 | 23874 |
| | 70 | 45 | 24243 | 23813 |
| | 80 | −14 | 24243 | 23751 |
| | 90 | −73 | 24243 | 23690 |
| | 100 | −130 | 24637 | 23992 |
| 525 | 0 | 525 | 24167 | 24167 |
| | 10 | 455 | 24167 | 24106 |
| | 20 | 387 | 24167 | 24045 |
| | 30 | 321 | 24167 | 23984 |
| | 40 | 256 | 24167 | 23923 |
| | 50 | 193 | 24167 | 23862 |
| | 60 | 130 | 24167 | 23801 |
| | 70 | 69 | 24167 | 23740 |
| | 80 | 10 | 24167 | 23679 |
| | 90 | −48 | 24167 | 23618 |
| | 100 | −106 | 24167 | 23557 |
| 550 | 0 | 550 | 24091 | 24091 |
| | 10 | 480 | 24091 | 24031 |
| | 20 | 412 | 24091 | 23970 |
| | 30 | 346 | 24091 | 23910 |
| | 40 | 281 | 24091 | 23849 |
| | 50 | 217 | 24091 | 23789 |
| | 60 | 155 | 24091 | 23729 |
| | 70 | 94 | 24091 | 23668 |
| | 80 | 34 | 24091 | 23608 |
| | 90 | −23 | 24091 | 23548 |
| | 100 | −81 | 24091 | 23487 |
| 575 | 0 | 575 | 24016 | 24016 |
| | 10 | 505 | 24016 | 23956 |
| | 20 | 437 | 24016 | 23896 |
| | 30 | 371 | 24016 | 23836 |
| | 40 | 306 | 24016 | 23777 |
| | 50 | 242 | 24016 | 23717 |
| | 60 | 180 | 24016 | 23657 |
| | 70 | 119 | 24016 | 23597 |
| | 80 | 59 | 24016 | 23537 |
| | 90 | .7 | 24016 | 23477 |
| | 100 | −56 | 24016 | 23418 |
| 600 | 0 | 600 | 23941 | 23941 |
| | 10 | 530 | 23941 | 23882 |
| | 20 | 462 | 23941 | 23826 |
| | 30 | 396 | 23941 | 23764 |
| | 40 | 331 | 23941 | 23704 |
| | 50 | 267 | 23941 | 23645 |
| | 60 | 205 | 23941 | 23586 |
| | 70 | 144 | 23941 | 23527 |
| | 80 | 84 | 23941 | 23467 |
| | 90 | 25 | 23941 | 23408 |
| | 100 | −32 | 23941 | 23349 |
| 625 | 0 | 625 | 23868 | 23868 |
| | 10 | 555.7 | 23868 | 23809 |
| | 20 | 488 | 23868 | 23750 |
| | 30 | 421 | 23868 | 23692 |
| | 40 | 356 | 23868 | 23633 |
| | 50 | 292 | 23868 | 23574 |
| | 60 | 230 | 23868 | 23515 |
| | 70 | 168 | 23868 | 23457 |
| | 80 | 108 | 23868 | 23398 |
| | 90 | 50 | 23868 | 23339 |
| | 100 | −7 | 23868 | 23281 |
| 650 | 0 | 650 | 23795 | 23795 |
| | 10 | 580 | 23795 | 23736 |
| | 20 | 512 | 23795 | 23678 |
| | 30 | 446 | 23795 | 23620 |
| | 40 | 381 | 23795 | 23562 |
| | 50 | 317 | 23795 | 23504 |
| | 60 | 254 | 23795 | 23446 |
| | 70 | 193 | 23795 | 23387 |
| | 80 | 133 | 23795 | 23329 |
| | 90 | 74 | 23795 | 23271 |
| | 100 | 17 | 23795 | 23213 |
| 675 | 0 | 675 | 23722 | 23722 |
| | 10 | 605 | 23722 | 23665 |
| | 20 | 537 | 23722 | 23607 |
| | 30 | 471 | 23722 | 23549 |
| | 40 | 406 | 23722 | 23492 |
| | 50 | 342 | 23722 | 23434 |
| | 60 | 279 | 23722 | 23376 |
| | 70 | 218 | 23722 | 23319 |
| | 80 | 158 | 23722 | 23261 |
| | 90 | 99 | 23722 | 23203 |
| | 100 | 41 | 23722 | 23146 |
| 700 | 0 | 700 | 23650 | 23650 |
| | 10 | 630 | 23650 | 23593 |
| | 20 | 562 | 23650 | 23536 |
| | 30 | 496 | 23650 | 23479 |
| | 40 | 431 | 23650 | 23422 |
| | 50 | 367 | 23650 | 23365 |
| | 60 | 304 | 23650 | 23308 |
| | 70 | 243 | 23650 | 23251 |
| | 80 | 183 | 23650 | 23193 |
| | 90 | 124 | 23650 | 23136 |
| | 100 | 66 | 23637 | |
| 725 | 0 | 725 | 23579 | 23579 |
| | 10 | 655 | 23579 | 23523 |
| | 20 | 587 | 23579 | 23466 |
| | 30 | 521 | 23579 | 23410 |
| | 40 | 456 | 23579 | 23353 |
| | 50 | 392 | 23579 | 23296 |
| | 60 | 329 | 23579 | 23240 |
| | 70 | 268 | 23579 | 23183 |
| | 80 | 207 | 23579 | 23126 |
| | 90 | 148 | 23579 | 23070 |
| | 100 | 90 | 23579 | 23013 |
| 750 | 0 | 750 | 23509 | 23509 |
| | 10 | 680 | 23509 | 23453 |

TABLE I-continued

| hc | lt | rp | Vc | Vt |
|---|---|---|---|---|
|  | 20 | 612 | 23509 | 23397 |
|  | 30 | 546 | 23509 | 23341 |
|  | 40 | 481 | 23509 | 23285 |
|  | 50 | 417 | 23509 | 23228 |
|  | 60 | 354 | 23509 | 23172 |
|  | 70 | 292 | 23509 | 23116 |
|  | 80 | 232 | 23509 | 23060 |
|  | 90 | 173 | 23509 | 23004 |
|  | 100 | 115 | 23509 | 22948 |
| 775 | 0 | 575 | 23439 | 23439 |
|  | 10 | 705 | 23439 | 23384 |
|  | 20 | 637 | 23439 | 23328 |
|  | 30 | 571 | 23439 | 23272 |
|  | 40 | 506 | 23439 | 23217 |
|  | 50 | 442 | 23439 | 23161 |
|  | 60 | 379 | 23439 | 23105 |
|  | 70 | 317 | 23439 | 23050 |
|  | 80 | 257 | 23439 | 23994 |
|  | 90 | 198 | 23439 | 23939 |
|  | 100 | 140 | 23439 | 23883 |
| 800 | 0 | 800 | 23370 | 23370 |
|  | 10 | 730 | 23370 | 23315 |
|  | 20 | 662 | 23370 | 23260 |
|  | 30 | 596 | 23370 | 23205 |
|  | 40 | 530 | 23370 | 23149 |
|  | 50 | 467 | 23370 | 23094 |
|  | 60 | 404 | 23370 | 23039 |
|  | 70 | 342 | 23370 | 22984 |
|  | 80 | 282 | 23370 | 22929 |
|  | 90 | 222 | 23370 | 22874 |
|  | 100 | 164 | 23370 | 22819 |
| 825 | 0 | 825 | 23301 | 23301 |
|  | 10 | 755 | 23301 | 23247 |
|  | 20 | 687 | 23301 | 23192 |
|  | 30 | 621 | 23301 | 23137 |
|  | 40 | 555 | 23301 | 23083 |
|  | 50 | 491 | 23301 | 23028 |
|  | 60 | 429 | 23301 | 22974 |
|  | 70 | 367 | 23301 | 22919 |
|  | 80 | 306 | 23301 | 22264 |
|  | 90 | 247 | 23301 | 22810 |
|  | 100 | 189 | 23301 | 22755 |

KEY
hc = height of circular orbit (nmi) for the tethered system's center of gravity
lt = length of tether (down position) (nmi)
rp = radius of perigee (nmi) - earth's radius (nmi)
vc = velocity in circular orbit (fps)
vt = velocity of debris as the result of the use of a tether (fps)

The testing of anti-satellite intercept weapons, whether they be ground based or in orbit, involves firing upon orbiting satelite targets. Some data currently exist which indicate that the portion of debris which is travelling parallel with the target velocity, could be imparted a velocity 30 percent greater than the target velocity. Thus, the "fly off" velocity for those debris could have a velocity up to 1.3 $V_T$ following impact with $V_T$ representing the velocity of the target prior to impact. In other words, rather than the situation where a wrench released during repairs on a tethered space station assumes the velocity of the lower altitude space station, the impact from the anti-satellite weapon has the potential for increasing the particle's velocity by a factor of 1.3. Debris whose fly off velocity was in the direction of orbit could, unless compensated for, result in an extended deorbit time period and the reduced ability to control the nature of the deorbit. The present invention naturally allows for extension of the tether length to compensate for such an increase in debris fly off velocity following impact by anti-satellite intercept weapons. Table II provides examples of the tether length required to deorbit the debris as a function of debris fly off velocity. While the table presents data for circular orbits, the same principle applies for eliptical orbits as well.

TABLE II

| hc | f | hp | lt |
|---|---|---|---|
| 250 | 0 | 140 | 16 |
|  |  | 0 | 37 |
| 500 | 0 | 140 | 55 |
|  |  | 0 | 78 |
|  | .15 | 140 | 352 |
|  |  | 0 | 372 |
| 800 | 0 | 140 | 104 |
|  |  | 0 | 130 |
|  | .15 | 140 | 419 |
|  |  | 0 | 442 |
|  | .30 | 140 | 677 |
| 1000 | 0 | 140 | 140 |
|  |  | 0 | 166 |
|  | .15 | 140 | 466 |
|  |  | 0 | 490 |
|  | .30 | 140 | 734 |
|  |  | 0 | 755 |
| 2000 | 0 | 140 | 338 |
|  |  | 0 | 372 |
|  | .15 | 140 | 720 |
|  |  | 0 | 752 |
|  | .30 | 140 | 1036 |
|  |  | 0 | 1063 | hc = height of circular orbit of center of mass of tethered system (nmi)
f = debris fly off velocity increase fraction
lt = length of tether (nmi)
hp = height of perigee (above earth's surface) of released target (nmi)

As illustrated in Table II, a very long tether (e.g., 675 nmi) would be required to achieve a controlled deorbit of particles subject to an increase in momentum of 30 percent following impact. Although the present invention has no theoretical limits, current strength of materials limits untapered tethers to about 675 nmi. However, tapering the tether with the thickest point of the center of gravity can reduce stresses (with a 5:1 taper) by a factor of 3. Of course, the diameter of the cable increases as the length of the tether increases. Accordingly, the space launch system restrictions on payload weight and volume currently further restrict the tether length and diameter. FIG. 3B illustrates tapered tether 44'.

Figure 6:
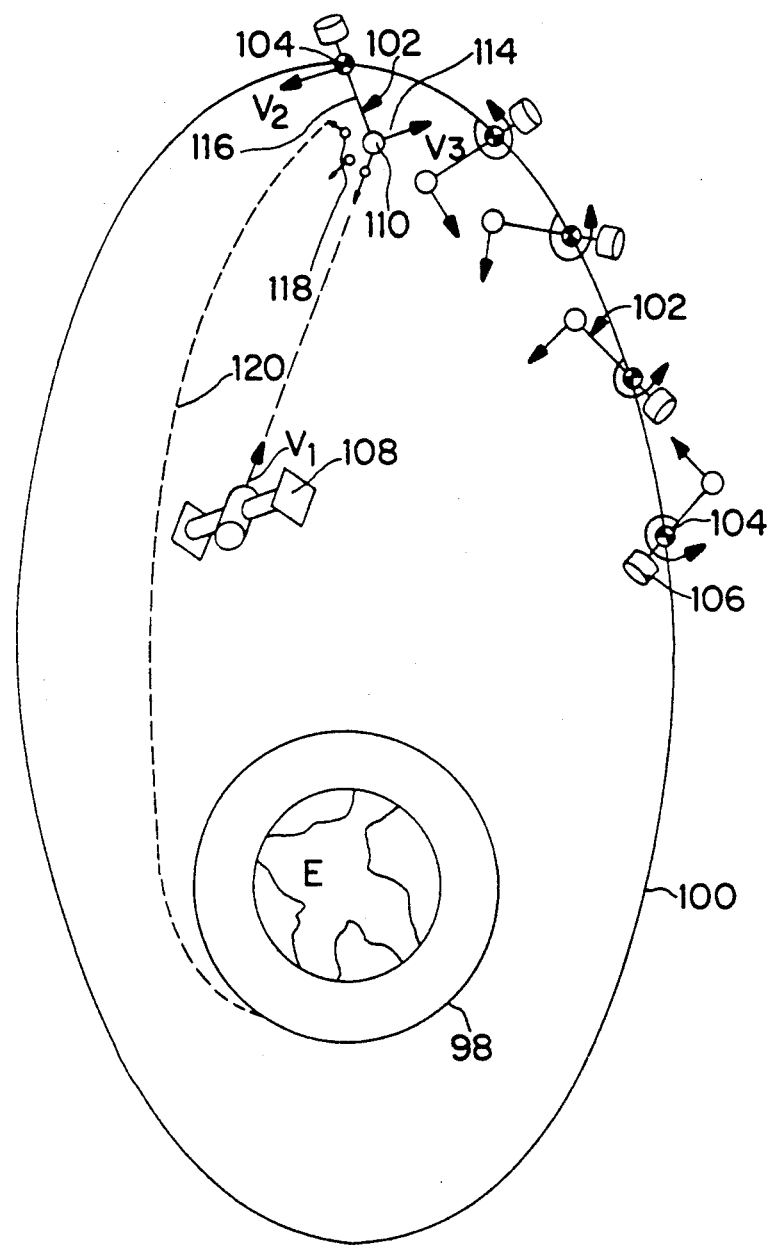
FIG. 6 shows a spinning tether assembly in an eliptical orbit.

FIG. 6 illustrates a method for helping to ensure that all particles of debris including those with increased velocity will be subject to a controlled deorbit. FIG. 6 shows an eliptical orbit 100 for tethered system 102. The method described is, however, applicable to other orbits as well. The method illustrated in FIG. 6 involves placing tethered satellite system 102 in rotation about its center of gravity 104 as it orbits about earth E. The spin of tethered satellite system 102 can be induced in any conventional manner such as by the use of reaction jets positioned within satellite 106. The rotation of tethered system 102 is used to offset the additional fly off velocity of the debris resulting from the engagement of an anti-satellite weapon 108. FIG. 6 illustrates tethered target 110 spinning about center of gravity 104 at the time of engagement. The velocity vector 114 is, at this time, essentially parallel with, but opposite to the velocity vector of the center of mass of the tethered system 104. The debris particles 118 are subject to being accelerated to a fly off velocity as great as 30 percent above the target 110 velocity. However, as a result of the reverse rotation of the target about the center of mass 104, the net resultant velocity is insufficient to maintain orbit and the debris 118 descends along the path 120 and impacts the earth's atmosphere 98. This benefit from utilizing a rotating system as opposed to an extra long tether to counteract the debris fly off issue can be shown using data from Table II. The tether length required to deorbit debris which receives a 30% increase in velocity following impact is about 677 nmi. If no additional velocity were imparted to the debris (at the same 800 nmi starting altitude) the required tether length is only 104 nmi. To counter the added fly off velocity to the debris with a 104 nmi tether and assure that all deorbits would require a rotation rate of about 5 revolutions per hour. Although tether stresses increase due to the rotation rate, the stress for the system is less than the stress for the long tether system by a factor of about 30.

Figure 7:
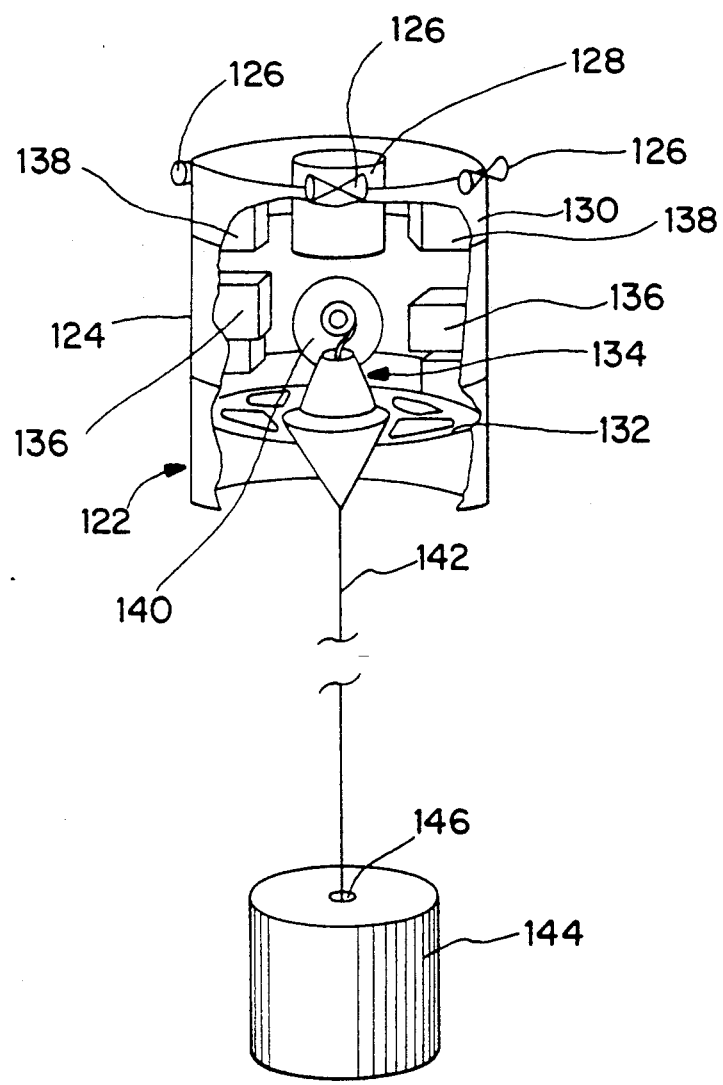
FIG. 7 shows a preferred embodiment of the tether system.

FIG. 7 illustrates one embodiment of the apparatus of the present invention. In FIG. 7, tethered system 122 is shown to include satellite 124 having reaction jets 126 and guidance means 128 such as an Initial Measurement Unit. Satellite 124 includes body casing 130 having a hollow interior and an underlying support bracket 132. Support bracket 132 supports tether dispensing and control system 134. Additional equipment can be provided within satellite 124 such as power generator 136. In addition, propulsion tanks 138 are provided for reaction jets 126 used to maintain a stable orbit. Tether dispenser and control system 134 includes dispensing reel 140 about which rotates tether line 142 attached at its lower end to target 144. Although not shown, dispensing reel 140 includes an appropriate braking device to help reel out the tethered target in a controlled fashion.

Target 144 can be a solid structure or, more preferably from the standpoint of volume limitations, a body inflated by a gas bottle or solid gas generator. A releasable locking means 146 is provided for connecting the tether line 142 to target 144. Various instrument means (not shown) can be provided in target 144 for tracking (e.g., corner reflector) or for scoring of the intercept (e.g., miss distance indicator). The tether line 142 is formed of KEVLAR (TM) together with an electrically conductible material. With line 142 electrically conductive, signals can be sent to releasable locking means 146 which can be utilized to detach target 144 following the ending of a test sequence. The KEVLAR material has the characteristic of providing high strength with low weight. Other fibers such as graphite or polyethylene (e.g., SPECTRA 1000) could likewise be used. This system uses about a hundred pound target, a tether weight of 150 pounds, and a satellite weight of 500 pounds. A 30 nmi tether would be subject to a load of about 6 pounds for a circular orbit of about 250 nmi. With such a load on tether line 142, the stress on a 1 mm diameter line would be about 4,000 psi which a KEVLAR material would be able to handle.

Although the present invention has been described with reference to preferred embodiments, the invention is not limited to the details thereof. Various substitutions and modifications will occur to those of ordinary skill in the art, and all such substitutions and modifications are intended to fall within the spirit and scope of an invention as defined in the following claims.

What is claimed is:

1. A method of mitigating space debris in a controllable fashion, comprising:
    placing a first body of mass $M_1$ in orbit about a planet;
    positioning a second body of mass $M_2$, which is subject to producing debris, in a lower altitude orbit by extending a tether line joining said first and second body out an essentially predetermined distance away from said first body, whereby said first body brakes said second body such that any debris produced by said second body deorbits at a rapid rate, and the step of extending said tether out away from said first body includes extending said tether a distance away from said first body which results in placing the debris in a controlled deorbit that is less than about one half orbital periods in duration.

2. A method as recited in claim 1 wherein said first body of mass $M_1$ is placed in a controlled, essentially circular orbit about the planet, and said second body is maintained in a tracking relationship with the center of gravity of said first body essentially in alignment with a line extending from the center of the orbit of said first body to the center of gravity of said first body.

3. A method as recited in claim 1 wherein mass $M_1$ is about 5 times greater than mass $M_2$.

4. A method as recited in claim 1 wherein said first body is placed in an elliptical orbit about said planet.

5. A method as recited in claim 1 wherein said tether is extended out away from said first body at a distance which is greater than 5 nmi and less than 1,000 nmi.

6. A method as recited in claim 1 wherein said first body is at an altitude above 140 nmi.

7. A method as recited in claim 6 wherein said second body is at an altitude of above 110 nmi.

8. A method as recited in claim 1 wherein said second body is at an altitude of above 140 nmi.

9. A method as recited in claim 8 wherein said tether length is greater than 5 nmi and less than 1,000 nmi.

10. A method for mitigating debris released from an orbiting target following impact by an interceptor, comprising:
    placing a satellite in essentially a predetermined orbit about a planet;
    positioning a target at a lower altitude with respect to said planet by extending a tether attached to said target out an essentially predetermined distance away from said satellite such that any debris resulting from intercept of said target experiences a deorbit which is more rapid than the target would assume had the target been orbiting at the same altitude about the planet in an untethered state and the length of said tether being sufficient to cause at least a majority of the debris resulting from intercept of said target to deorbit within 0.5 orbital periods.

11. A method for mitigating space debris as recited in claim 10 wherein said predetermined orbit is circular and of an altitude greater than about 100 nmi and said tether is extended out a distance greater than 5 nmi.

12. A method for mitigating space debris as recited in claim 10 wherein said target and tethered satellite, in combination, have a center of mass and said target and tethered satellite are rotated about the center of mass while orbiting about said planet, such that the direction of rotation for said target at the time of intercept impact is essentially opposite in direction to the direction said center of mass is travelling.

13. A method as recited in claim 10 wherein said predetermined orbit is elliptical and said tether is of sufficient length to ensure deorbit of essentially all of any debris produced following impact of said target by the interceptor at a time when said tethered satellite is about at an apogee position in the elliptical orbit of said tethered satellite.

14. A method as recited in claim 13 further comprising rotating said satellite, target and tether about a common point while said satellite, target and tether orbit about the planet such that the direction of rotation for said target at the time of intercept impact is essentially opposite in direction to the direction of travel of the common point.

15. An apparatus for mitigating space debris which develops during anti-satellite intercept testing, comprising:
- a satellite;
- an anti-satellite intercept target;
- a tether line connected at one end to said target and at another end to said satellite;
- said satellite including tether dispensing means for extending and retracting said tether out away from said satellite; and
- said tether having a length which is in the range of 675 nmi to 1000 nmi.

16. An apparatus as recited in claim 15 wherein said tether is tapered.

17. An apparatus as recited in claim 16 wherein said tether has a 5:1 taper.

18. An apparatus as recited in claim 15 wherein the mass of said satellite is about 5 times greater than the mass of said target.

19. An apparatus as recited in claim 15 wherein said tether is of a length which is sufficient to cause the deorbiting of at least a majority of any debris created by said target upon impact with an interceptor within less than 0.5 orbital periods.

20. An apparatus as recited in claim 15 wherein said target includes an inflatable main body.

21. An apparatus as recited in claim 15 further comprising attachment means for releasably attaching said target to said tether.

22. An apparatus as recited in claim 21 wherein said attachment means is remotely controlled from said satellite and said tether line is formed of a conducting material.

23. An apparatus as recited in claim 15 wherein said satellite includes means for placing said satellite, target and tether in rotation about the center of gravity for the combination of said satellite, target and tether.

24. A method of mitigating space debris in a controllable fashion, comprising:
- placing a first body of mass $M_1$ in orbit about a planet;
- positioning a second body of mass $M_2$, which is subject to producing debris and is of a mass 5 times less than mass $M_1$, in a lower altitude orbit by extending a tether line joining said first and second body out an essentially predetermined distance away from said first body, whereby said first body brakes said second body such that any debris produced by said second body deorbits at a rapid rate.

25. A method as recited in claim 24 wherein said first body of mass $M_1$ is placed in a controlled, essentially circular orbit about the planet, and said second body is maintained in a tracking relationship with the center of gravity of said first body essentially in alignment with a line extending from the center of the orbit of said first body to the center of gravity of said first body.

26. A method as recited in claim 24 wherein said first body is placed in an elliptical orbit about said planet.

27. A method as recited in claim 24 wherein said tether is extended out away from said first body at a distance which is greater than 5 nmi and less than 1,000 nmi.

28. A method as recited in claim 24 wherein said first body is at an altitude above 140 nmi.

29. A method as recited in claim 28 wherein said second body is at an altitude of above 110 nmi.

30. A method as recited in claim 24 wherein said second body is at an altitude of above 140 nmi.

31. A method of mitigating space debris in a controllable fashion, comprising:
- placing a first body of mass $M_1$ in orbit about a planet;
- positioning a second body of mass $M_2$, which is subject to producing debris, in a lower altitude orbit by extending a tether line joining said first and second body out an essentially predetermined distance away from said first body, whereby said first body brakes said second body such that any debris produced by said second body deorbits at a rapid rate and said step of placing said first body includes placing said first body at an altitude above 140 nmi.

32. A method as recited in claim 31 wherein said first body of mass $M_1$ is placed in a controlled, essentially circular orbit about the planet, and said second body is maintained in a tracking relationship with the center of gravity of said first body essentially in alignment with a line extending from the center of the orbit of said first body to the center of gravity of said first body.

33. A method as recited in claim 31 wherein said first body is placed in an elliptical orbit about said planet.

34. A method as recited in claim 31 wherein said second body is at an altitude of above 110 nmi.

35. A method as recited in claim 31 wherein said second body is at an altitude of above 140 nmi.

36. A method of mitigating space debris in a controllable fashion, comprising:
- placing a first body of mass $M_1$ in orbit about a planet;
- positioning a second body of mass $M_2$, which is subject to producing debris, in a lower altitude orbit by extending a tether line joining said first and second body out an essentially predetermined distance away from said first body, whereby said first body brakes said second body such that any debris produced by said second body deorbits at a rapid rate and said step of positioning said second body includes positioning said second body at an altitude of above 140 nmi.

37. A method as recited in claim 36 wherein said first body of mass $M_1$ is placed in a controlled, essentially circular orbit about the planet, and said second body is maintained in a tracking relationship with the center of gravity of said first body essentially in alignment with a line extending from the center of the orbit of said first body to the center of gravity of said first body.

38. A method as recited in claim 36 wherein said first body is placed in an elliptical orbit about said planet.

39. An apparatus for mitigating space debris which developed during anti-satellite intercept testing, comprising:
- a satellite;
- an anti-satellite intercept target;
- a tether line connected at one end to said target and at another end to said satellite;
- said satellite including tether dispensing means for extending and retracting said tether out away from said satellite and said satellite having a mass which is about 5 times greater than the mass of said target.

40. An apparatus as recited in claim 39 wherein said tether is of a length which is sufficient to cause the deorbiting of at least a majority of any debris created by said target upon impact with an interceptor within less than 0.5 orbital periods.

41. An apparatus as recited in claim 39 further comprising attachment means for releasably attaching said target to said tether.

42. An apparatus as recited in claim 41 wherein said attachment means is remotely controlled from said satellite and said tether line is formed of a conducting material.

43. An apparatus as recited in claim 39 wherein said satellite includes means for placing said satellite, target and tether in rotation about the center of gravity for the combination of said satellite, target and tether.

44. An apparatus for mitigating space debris which developed during anti-satellite intercept testing, comprising:
   a satellite;
   an anti-satellite intercept target;
   a tether line connected at one end to said target and at another end to said satellite;
   said satellite including tether out away from dispensing means for extending and retracting said tether out away from said satellite wherein said tether is of a length which is sufficient to cause the deorbiting of at least a majority of any debris created by said target upon impact with an interceptor within less than 0.5 orbital periods.

45. An apparatus as recited in claim 44 further comprising attachment means for releasably attaching said target to said tether.

46. An apparatus as recited in claim 45 wherein said attachment means is remotely controlled from said satellite and said tether line is formed of a conducting material.

47. An apparatus as recited in claim 44 wherein said satellite includes means for placing said satellite, target and tether in rotation about the center of gravity for the combination of said satellite, target and tether.

48. An apparatus for mitigating space debris which developed during anti-satellite intercept testing, comprising:
   a satellite;
   an anti-satellite intercept target;
   a tether line connected at one end to said target and at another end to said satellite;
   said satellite including tether dispensing means for extending and retracting said tether out away from said satellite, and said apparatus further comprising attachment means for releasably attaching said target to said tether.

49. An apparatus as recited in claim 48 wherein said attachment means is remotely controlled from said satellite and said tether line is formed of a conducting material.

* * * * *